(No Model.)
W. M. KLINEFELTER.
STEAM TRAP.
No. 373,833. Patented Nov. 29, 1887.
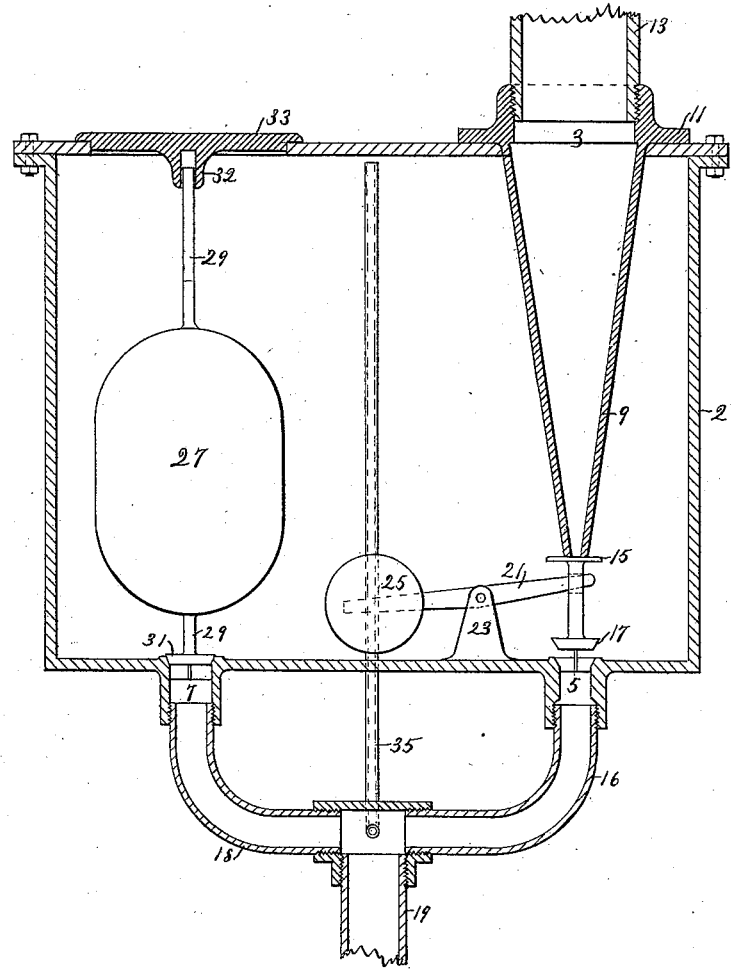
Witnesses.
S. J. Beardsley.
A. M. Gaskill.
Inventor.
William M. Klinefelter.
By A. C. Paul, atty.

UNITED STATES PATENT OFFICE.

WILLIAM M. KLINEFELTER, OF ST. PAUL, MINNESOTA.

STEAM-TRAP.

SPECIFICATION forming part of Letters Patent No. 373,833, dated November 29, 1887.

Application filed June 21, 1887. Serial No. 241,958. (No model.)

*To all whom it may concern:*

Be it known that I, WILLIAM M. KLINE-FELTER, of St. Paul, in the county of Ramsey and State of Minnesota, have invented certain new and useful Improvements in Steam-Traps, of which the following is a specification.

My invention relates to an improved steam-trap for the purpose of automatically releasing the water of condensation from steam-pipes; and it consists, generally, in the construction and combination hereinafter described, and particularly pointed out in the claims.

The drawing shows a central vertical section of a trap embodying my improvement.

2 represents the outer case or body of the trap, which is preferably provided with an inlet, 3, and two outlet-openings, 5 and 7, which communicate by pipes 16 and 18 with a common discharge-pipe, 19.

9 represents a cone shaped nozzle extending downward into the casing through the opening 3, and preferably provided with a flange, 11, by which it is secured to the top of the casing. The upper end of the cone-shaped nozzle has an internal screw-thread and receives the end of the steam-pipe 13. The lower extremity of the nozzle 9 is arranged to be closed by a disk, 15, which is attached to a valve, 17, arranged to fit a seat in the opening 5. The valve 17 and disk 15 are so constructed that when one is on its seat and closed the other shall be open. When in the position shown in the drawing, the disk 15 closes the opening in the nozzle 9, and the valve 17 is off its seat and leaves an outlet from the interior of the trap to the discharge-pipe 19.

21 is a lever pivoted from a suitable fulcrum, 23. One end of this lever is passed through a slot in the neck of the valve 17, and the outer end is preferably provided with a weight, 25. This weight operates to raise the valve 17 off its seat, as shown, but is not sufficient to hold it in this position against a pressure of steam or water upon the disk 15.

27 represents a float, preferably attached by a rod, 29, to a valve, 31, which is seated in the opening 7. The casing is provided with an opening in its top, through which the float may be inserted, and this opening is closed by a cap, 33. To keep the valve 31 in line and insure the operation of the float, I prefer to provide a guide for the rod 29. This may be done by placing a collar, 32, upon the under side of the cap 33 and allowing the end of the rod 29 to project into the recess formed by this collar, and the distance between the end of the rod and the bottom of the recess will limit the lift of the valve.

The operation is as follows: The trap is located at the lowest point in a system of heating-pipes, to which it is connected by the pipe 13. When pressure is put upon the pipe, the steam will enter the trap through the nozzle 9. This will cause the disk 15 to be forced downward, and the valve 17 will seat itself over the opening 5 and prevent any escape of steam. As condensation takes place in the pipes the water will flow into the trap through the nozzle 9 until it reaches a point where it will cause the float 27 to rise, thereby lifting the valve 31 off from its seat and allowing the water in the trap to pass off through the discharge-pipe 19, and in this way keeping the trap and the pipe to which it is connected free from a surplus of water. When the steam-pressure is removed from the pipes, the valve 17 will be raised off its seat by the action of the weighted lever 21, and any small amount of water which may remain in the trap will flow out through the opening 5, and thus avoid any possibility of freezing.

It may be found necessary to provide means to prevent the discharge-pipe 19 from freezing. In this case I have shown and prefer to provide a small pipe, 35, extending up into the trap nearly to the top wall, and at its lower end opening into the pipe 19.

The steam from the trap will flow down through this pipe into the pipe 19 and cause sufficient heat to prevent the ice from forming in said pipe; but the outlet will not be sufficiently large to cause any inconvenience or show any perceptible leakage.

This trap is designed particularly for use with the steam-heating apparatus of railway-cars, where it is necessary to get rid of all the water of condensation that collects in the pipes. The trap may, however, be used with other apparatus and in connection with other steam-pipes from which it is desired to collect and discharge the water of condensation.

I claim as my invention—

1. The combination, in a steam-trap, with the casing 2, having an inlet-opening, 3, and an outlet-opening, 5, of the nozzle 9, extending into said casing through said inlet-opening, the valve 17, and disk 15, secured thereto, and the pivoted lever 21, engaging the neck of said valve and provided with the adjustable weight 25, substantially as described.

2. The combination, in a steam-trap, with the casing 2, having the inlet-opening provided with the nozzle 9 and the two outlet-openings 5 and 7, of the valve 17, the disk 15, secured to the neck of said valve, the pivoted lever 21, the weight 25, secured to said lever, the valve 31, and float 27, all substantially as described.

3. The combination, in a steam-trap, with the casing 2, having the inlet-opening provided with the nozzle 9, of the valve 17, the disk 15, secured to the stem of said valve, the valve 31, float 27, pipes 16 and 18, connected with the discharge-pipe 19, and the steam-pipe 35, extending from the casing into said discharge-pipe, substantially as described.

4. The combination, in a steam-trap, of a suitable casing, an inlet-pipe extending into said casing, a float-valve, and a supplemental valve provided with a disk or plate arranged to close the inlet-pipe when the valve is raised from its seat, and a weighted lever adapted to hold said valve in a raised position, substantially as described.

In testimony whereof I have hereunto set my hand this 15th day of June, 1887.

WILLIAM M. KLINEFELTER.

In presence of—
  A. CHILGREN,
  A. W. CAMMIK.